United States Patent [19]
Kölln

[11] Patent Number: 4,753,179
[45] Date of Patent: Jun. 28, 1988

[54] FIRE-RESISTANT CEILING ELEMENT FOR AN INDUSTRIAL FURNACE, CEILING FOR AN INDUSTRIAL FURNACE MADE OF FIRE-RESISTANT CEILING ELEMENTS, AND INDUSTRIAL FURNACE WITH SUCH A CEILING

[75] Inventor: Bernd Kölln, Ammerndorf, Fed. Rep. of Germany

[73] Assignee: Riedhammer GmbH und Co. KG., Fed. Rep. of Germany

[21] Appl. No.: 765,669

[22] Filed: Aug. 14, 1985

[30] Foreign Application Priority Data

Aug. 18, 1984 [DE] Fed. Rep. of Germany ....... 3430470

[51] Int. Cl.⁴ ............................................. F23M 5/06
[52] U.S. Cl. ..................................... 110/332; 110/335
[58] Field of Search .............. 110/331, 332, 333, 334, 110/335; 432/247

[56] References Cited

U.S. PATENT DOCUMENTS 4,539,919 10/1985 Bossetti .............................. 110/331

FOREIGN PATENT DOCUMENTS 1832912 6/1961 Fed. Rep. of Germany .
1815687 8/1970 Fed. Rep. of Germany .

Primary Examiner—Edward G. Favors
Attorney, Agent, or Firm—John F. A. Earley; John F. A. Earley III

[57] ABSTRACT

To simplify the insertion and to improve the stability as well as to avoid mechanical damage to a ceiling of an industrial furnace, the invention proposes a fire-resistant ceiling element to be used as a self-supporting building element which can be inserted on the side of the furnace channel.

27 Claims, 3 Drawing Sheets

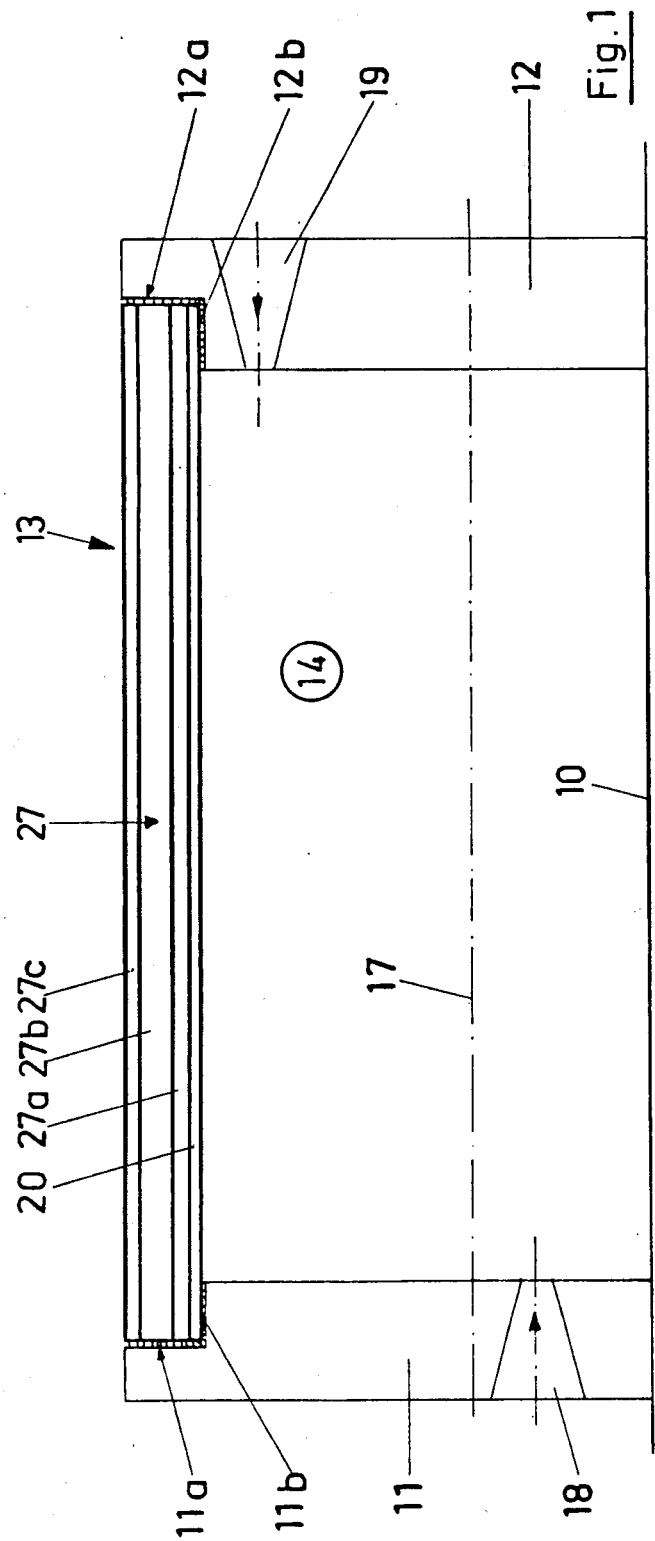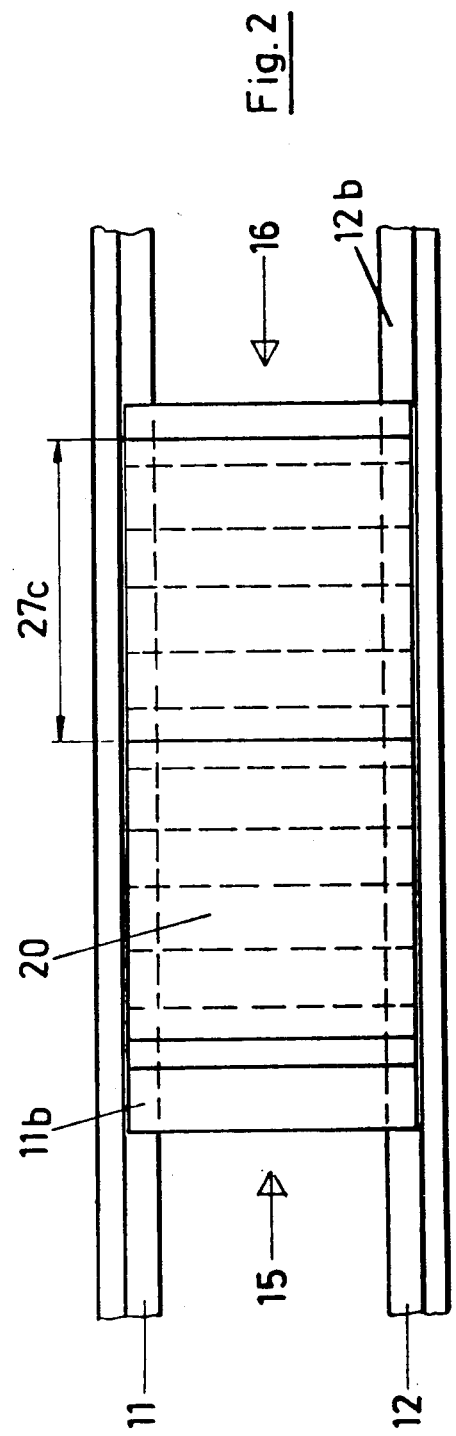

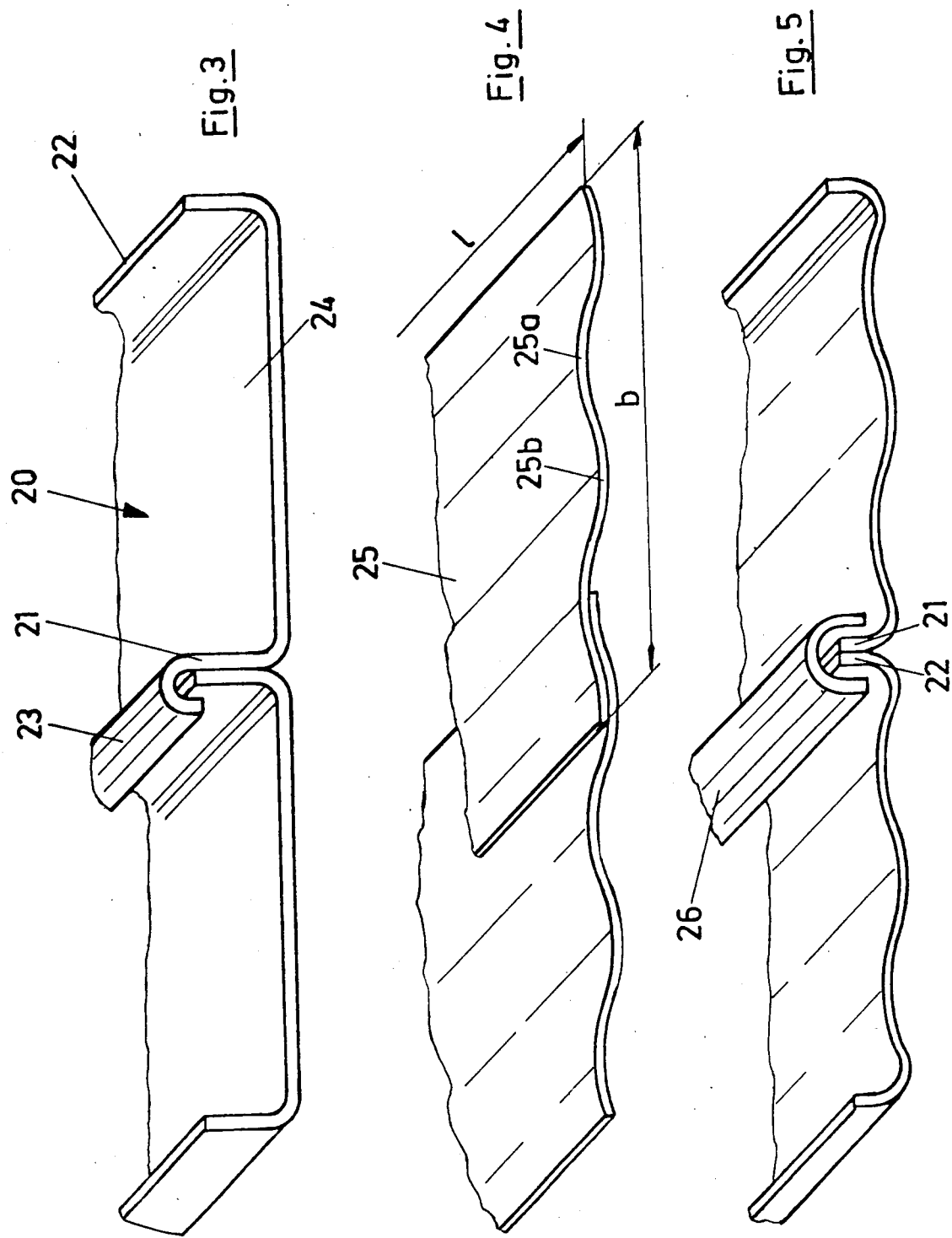

FIRE-RESISTANT CEILING ELEMENT FOR AN INDUSTRIAL FURNACE, CEILING FOR AN INDUSTRIAL FURNACE MADE OF FIRE-RESISTANT CEILING ELEMENTS, AND INDUSTRIAL FURNACE WITH SUCH A CEILING

BACKGROUND OF THE INVENTION

The invention is directed to a fire-resistant ceiling element for an industrial furnace, a ceiling for an industrial furnace made of ceiling elements as well as an industrial furnace with such a ceiling.

Different ceilings for industrial furnaces are known. One possibility is the construction of a ceiling in the shape of an arch. In most cases circular curve arches are used. The arch is then constructed of radial stones of commercial format.

The arches can for example consist of silicon or fire clay stones. The stability of such arch constructions is limited though, since crystal modifications in fire clay stones, for example, cause changes in volume under exposure to different temperatures.

Arch constructions are used, for example, for glass tanks or Siemens-Martin-furnaces.

Particularly for greater arch spans arch constructions are not useable. In these cases so-called hanging ceilings are installed, which are also made of fire-resistant stones sustained in a hanging position by a steel construction, which is not exposed to high temperature changes. There are a number of different variations of such hanging ceilings (for example in the German Disclosure Document No. 18 15 687). One advantage of the hanging ceilings is that the shape can be flexible. Consequently, level hanging ceilings are also possible.

Depending on the temperature requirement the stones for such hanging ceilings are made of different fire-resistant qualities.

The hanging ceilings exhibit many disadvantages as well.

Since they are composed of a great number of individual stones which, moreover, must be anchored in a steel construction, the assembly requirements are great. Such walls, moreover, are very heavy. When heating the furnace, the big ceiling mass is heated as well, sometimes leading to the requirement of extremely higher energy loads. A use of this construction in periodically operated furnaces, i.e., in firms where the furnaces are to be turned off over the weekends or on holidays, leads to volume expansions and contractions in the fire-resistant stones, caused by the constant heating and cooling process. Moreover, tensions build up, leading to cracks. Falling individual particles or crystals of the fire-resistant stones cannot always be avoided.

Especially when using such industrial furnaces for delicate firing material, damage caused by falling debris occurs often. When firing sanitary ceramics, for example, falling particles of the fire-resistant materials landing on the glaze can make the finished glazed product worthless.

Once these hanging ceilings sustain greater damage, their repair is very complicated since the damaged areas are hard to reach without turning off the furnace.

The anchoring of the fire-resistant stones in a metallic frame, finally, is also problematic, not only because the two materials have different heat expansion coefficients, but also because the fire-resistant materials can be exposed to corrosion through the metal anchor and the insulation of the ceiling as such is cut off at the point of those metal suspensions. From the German Utility Model No. 18 32 912 a ceiling element is known, which consists of a reinforced tamping clay. This makes the ceiling element heavier, and under exposure to higher temperatures problems arise, since the heat expansion coefficients in reinforcing and fire-resistant materials differ.

SUMMARY OF THE INVENTION

The invention has the task to find the possibility to construct ceilings for industrial furnaces that not only are quickly and easily installable but also have high inherent stability, thus avoiding loosening or falling parts of the ceiling material. The ceiling should, moreover, have good insulation qualities and be easily accessible for repair work.

The invention solves this task with a fire-resistant ceiling element according to claim 1, which is used as a self-supporting building part of the ceiling of an industrial furnace to be inserted on the side of the furnace channel; as well as with a ceiling for an industrial furnace with the characteristics in claim 9; and an additional furnace itself with the characteristics in claim 11. Further advantageous developments are described in the remaining claims and the registration documents.

An essential characteristic of the invention is the fact that the ceiling of an industrial furnace is constructed as a self-supporting unit with the use of corresponding self-supporting fire-resistant ceiling elements. A variation according to the invention plans for the ceiling to be constructed with the fire-resistant ceiling elements which extend between opposite sides of the furnace channel or furnace chamber of an industrial furnace.

For this purpose the ceiling parts must fulfill two criteria in particular. They must have sufficient strength, particularly flexural strength as well as sufficient temperature resistance and temperature change resistance. Depending on the width of the furnace chamber, i.e., the furnace channel, as well as the maximal temperatures that can be obtained therein, the fireproof ceiling parts can be varied as to their structural as well as their chemical-mineralogical makeup.

When using fireproof ceiling elements with basically longish rectangular shape (when viewed from above), profiles with U-shaped cross-sections (vertical to the longitudinal expansion) can be used to obtain favorable flexural strength.

In order to further increase the flexural stiffness, the basic sides of such a U-shaped ceiling element can in addition be undulated, saw-tooth or merlon shaped. A further improvement of the flexural stiffness can be achieved by giving the ceiling elements or parts thereof a convex shape in relationship to the furnace channel.

Depending on the furnace type and the temperatures that can be reached therein, the ceiling elements can be made of different materials. Since the invention uses the term fire-resistant ceiling elements, this expression "fire-resistant" shall include those building parts which have an approximate melting point of over 1200° C. (decimal Segerkegel No. 123).

Silicon carbide products are used especially for higher temperature ranges of up to 1600° C., because of their favorable thermal expansion coefficient and good flexural strength.

An appropriate material for ranges of up to 1400° C. is reaction bonded silicon carbide, infiltrated with silicon SiSiC, which is extremely hard, highly resistant against erosion, corrosion and oxidation as well as gas proof. The manufacture of such a material is made in the powder technological process by using different shaping methods, such as casting. This material is especially appropriate for periodically (non-continuously) operated furnaces because of its favorable thermal shock resistance and low creep expansion under high temperatures. The low heat expansion and high shape retention, combined with favorable mechanical properties, make it possible to also produce bigger ceiling elements from this material so that the entire width of bigger furnace channels or chambers can be covered with the ceiling elements without requiring any additional support.

Under even higher work temperatures recrystallized silicon carbide material can be used among others. This material has the favorable properties that its flexural strength increases at the same time as the temperature increases. While it is 100 MPa at 20° C., for example, it is 20% higher at 1250° C. and even about 30% higher than the values at room temperature, when 1400° C. are reached. The maximum temperature for this material lies only at approximately 1600° C.

A ceiling for an industrial furnace under the invention consists of several consecutively arranged fire-resistant ceiling elements with the above-described specifications, as well as one or more insulating layers, one on top of the other. The ceiling elements are preferably connected to each other in a form-fit or non-positive way by forming a close ceiling base. The connection of the fire-resistant ceiling elements to each other is important to avoid clefts or cracks in the ceiling, through which combustion gases can escape or infiltrated air can be absorbed.

Depending on the shape of the fire-resistant ceiling elements, it can be useful in addition to seal the connecting points of the ceiling elements. For this purpose the ceiling elements can be made so that sections of them overlap each other; if necessary tongue and groove joints can be used.

Above the fire-resistant ceiling elements different insulation layers are arranged. Because of the thermal conditions as well as to reduce cost, insulating layers with lower temperature resistance can be used in layers that are further removed from the ceiling elements. Especially advantageous is the use of fiber insulation, which is very light weight and easy to work with. Such fiber materials can be obtained in mat form and can easily be placed on the fire-resistant ceiling elements, which are arranged side by side and connected to one another.

An advantageous additional dimension of the invention thought plans for prefabricated compact building blocks consisting of the fire-resistant ceiling elements with the differing layer of insulation on top, to be used. The fire-resistant ceiling elements with insulation can then—so to speak—be used as "compound material" in the insulation of the ceiling. To avoid cracks and open seams in this case between the individual building parts, the compound elements are connected to each other preferably with tongue and groove joints.

In a roller furnace for the firing of ceramic products, for example, the furnace ceiling is placed on the side walls—directly or indirectly detachable. For this purpose the furnace walls can, for example, be equipped with a bearing, open toward the insides, in which the fire-resistant ceiling elements can be secured. Such a device not only enables an easy installation process but in case of trouble allows for a quick removal and thus easy access to the furnace channel.

A lifting device, for example, can also be installed in the side walls, to lift the ceiling as a whole or segments thereof for repair work.

The advantages this invention offers are obvious. Compared to conventional ceilings, especially hanging ceilings, the installation is essentially simplified.

While hanging ceilings usually require the installation of 31 fire-resistant stones per square meter which then have to be secured to the steel construction, the installation of one or two fire-resistant ceiling elements under the invention suffices, which moreover can easily be secured on the furnace walls. The insulation can be much more easily attached. Since it is possible to use particularly light insulation materials, the weight of the ceiling is drastically reduced. Last but not least, the to be heated amount of mass is remarkably smaller, which is particularly advantageous for periodically operated furnaces.

The insulation properties can be essentially improved. While the loss of heat with hanging ceilings—constructed in the conventional fashion with insulation stone—amounts to about 1140 kcal/m$^2$/h, this value can be reduced with a ceiling constructed according to the invention to less than 700 kcal/m$^2$/h.

The investment costs are also lower.

The fact that the ceiling under the invention consists of only a few self-sustaining building blocks eliminates the problem of falling fire-resistant particles on the to be fired wares in the furnace channel, i.e., in the furnace chamber, completely. The lowest layer of the furnace ceiling is preferably self-contained and gas proof.

The fire-resistant ceiling elements under the invention as well as the ceilings manufactured from those are suitable for any kind of industrial furnace, for stationary, non-continuously operated furnaces, which are allowed to cool off after every heating process, as well as for so called continuous-heating furnaces. The area of use expands from furnaces for melting or thermal treatment of metals to industrial furnaces for the ceramics industry, for example roller furnaces for sanitary ceramics.

BRIEF DESCRIPTION OF THE DRAWINGS

The drawings, by way of example, will explain the invention in greater detail.

FIG. 1 is a main cross-section through a roller furnace under the invention (shown schematically).

FIG. 2 is a view from above onto the ceiling of a roller furnace according to the invention in accordance with FIG. 1 (shown schematically).

FIG. 3 is a view showing a variation of the fire-resistant ceiling elements according to the invention.

FIG. 4 is a view showing another variation of a fire-resistant ceiling element according to the invention.

FIG. 5 is a view showing a third variation of a fire-resistant ceiling element with connecting part according to the invention.

DESCRIPTION OF THE PREFERRED EMBODIMENTS

Figure 6:
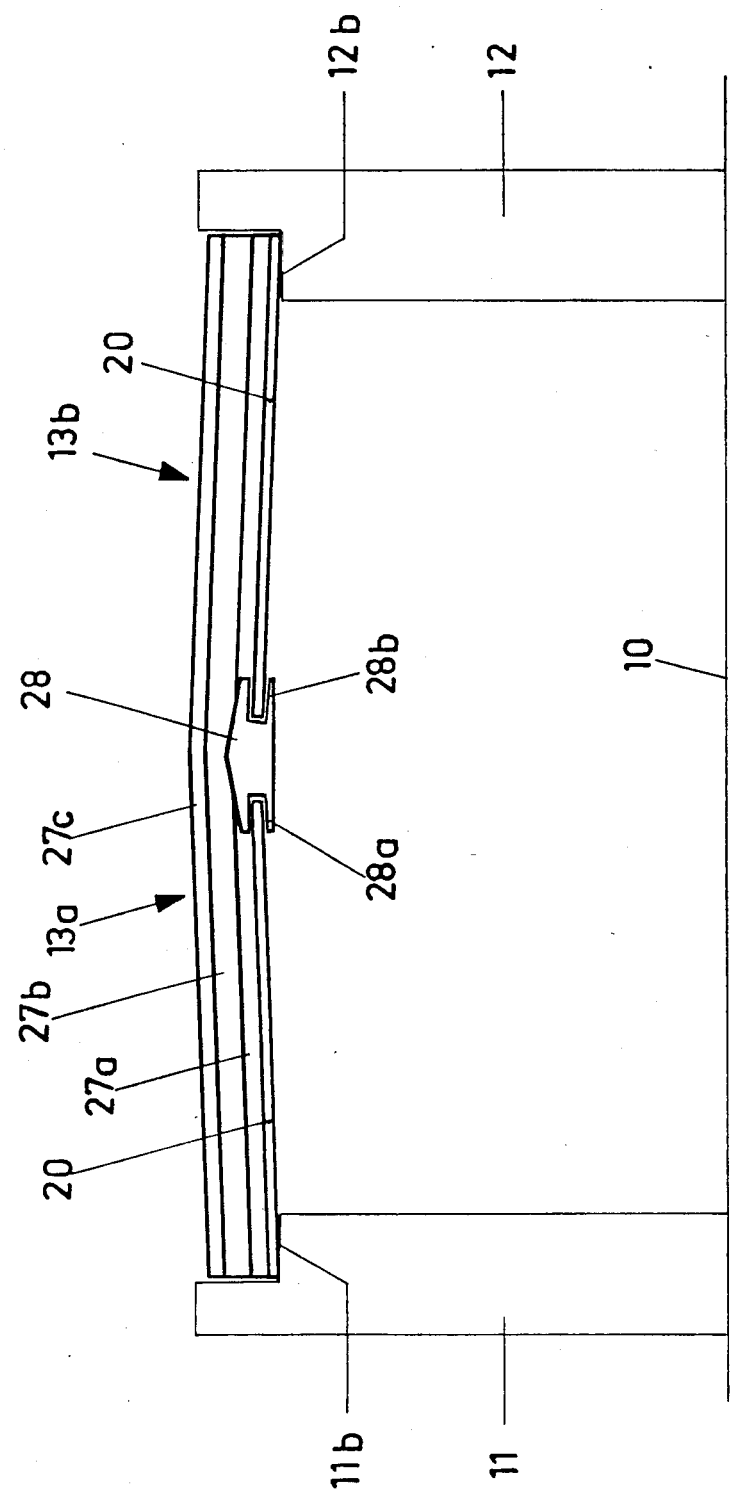
FIG. 6 is a view showing a furnace with double furnace channel breadth according to the invention.

FIG. 1 shows an industrial furnace according to the invention, i.e., a tunnel roller furnace for the firing of ceramic wares.

The furnace is erected on a foundation 10 and essentially consists of two side walls 11, 12 and one ceiling 13 (also referred to in the art as an arch), which extends between the side walls 11, 12. Foundation 10, the side walls 11, 12 and the ceiling 13 enclose the furnace channel 14, through which the wares to be fired (not shown) pass on rolls, indicated at 17, that are arranged one behind the other from the beginning of the furnace 15 to its end 16.

The rolls 17 extend over the entire breadth of the furnace channel and the side walls 11, 12 in which they also pivot. The control for the rolls 17 is on the outside and is executed by devices such as, for example, a chain drive, with which the individual rolls are connected to one another.

Along the passage of the furnace and at different heights there are burners 18, 19 in the side walls 11, 12. Two of these are shown in FIG. 1.

The ceiling 13 under the invention is, as shown in FIGS. 1 and 2, constructed of fire-resistant ceiling elements 20, which are consecutively arranged and extend between the side walls 11, 12.

The side walls 11, 12 are equipped with bearings open towards the inside 11a, 12a to support the fire-resistant ceiling elements 20. Thus the fire-resistant ceiling elements 20 which, as shown in FIG. 2, have a rectangular shape when viewed from above can be supported between the side walls 11, 12 with their small ends on the horizontal sections 11b, 12b of the bearings 11a, 12a. In this fashion the fire-resistant ceiling elements 20 are self-supporting building parts of the ceiling which can be inserted on the side of the furnace channel. The connection to the side walls is either made possible by simply laying the elements on top or also screwing or clamping them to the bearings. Samples of fire-resistant ceiling elements 20 can be seen in FIGS. 3 through 5.

In the version in FIG. 3 the ceiling elements 20 have an essentially U-shaped cross-section, vertically to their longitudinal expansion. The two parallel U-shaped sections 21, 22 can significantly increase the flexural strength of the building part. The individual ceiling parts 20 are anchored in each other in the example in FIG. 3 by the fact that one U-shaped section 21 each is crimped over at its open front end. The fold 23 is made so that it can enclose side 22, which basically runs vertically to the base side 24 of the next ceiling element 20. With this process the ceiling element-compound which makes up the ceiling, forms a seal on the side of the furnace channel 14. The fold 23 can have an opening with which it can easily enclose the U-section 22, but one can also plan an additional seal on the side of the furnace channel 14 in the area of the fold 23.

Another version of the self-supporting ceiling elements 20 can be seen in FIG. 4. These ceiling elements 20 are of much greater length "l" compared to their breadth "b" and thus appear basically rectangular shaped when viewed from above. They do not have crimped-over U-sections. On the other hand the base surface 25 is undulated in this case to increase the flexural strength of the ceiling elements. One construction could also have a saw-tooth or merlon shaped cross-section, vertically for the longitudinal expansion.

With these interacting crests 25a and troughs 25b, the ceiling 20 can be easily connected and sealed together with the adjacent ceiling elements parallelly overlapping along a certain section.

A third variation of a self-supporting fire-resistant ceiling element according to the invention is shown in FIG. 5. In this case each ceiling element 20 has a U-shaped cross-section, vertically to their longitudinal expansion. Between the parallel U-sections 21, 22 which, contrary to the version in FIG. 3, are not bent at their ends, the base side 24 is undulated as in the version in FIG. 4.

To connect the individual ceiling elements 20 of FIG. 5 with each other, these are simply put together with their U-shaped sections and covered with a element 26, with semi-circular cross-section, which is fitted upside down over the two U-shaped sections 21, 22, lying next to each other. Additional sealing material (not shown) can be inserted between the U-shaped sections 21, 22 and the element 26 to further improve the sealing effect of the ceiling.

The element 26 is preferably made of the same material as the self-supporting ceiling elements 20. Particularly suitable for the fulfillment of this task, especially in respect to high flexural strength, temperature stability and temperature change stability, are silicon carbide materials, such as reaction bonded silicon carbide infiltrated with silicon SiSiC, and recrystallized silicon carbide.

Reinforced ceiling elements can be used to achieve great span width between the bearings at the ends. The reinforcing material can be high temperature resistant fibers or tissues, such as carbon fibers.

Apart from the shapes represented in FIGS. 2 through 5, the self-supporting ceiling elements 20 can have various different shapes. A useful version intends for the ceiling elements or parts thereof to be convex shaped in respect to the mean longitudinal axis of the furnace 14 so that the ceiling element 20, when viewed at one point along the passage of the furnace, shows sections that are further removed from the foundation base 10 than others. This can produce arch-like ceiling constructions, over which the combustion gases could possibly be directed. The ceiling 13 as such does not only consist of fire-resistant or highly fire-resistant ceiling elements 20, though, but has moreover as insulation 27, arranged thereupon, which consists of three layers 27a, b, c in the version in FIG. 1.

In this case the insulation layer 27a has a higher thermal resistance as compared with the insulation 27b. The top insulation layer 27c has the lowest temperature resistance, since this area of the ceiling is also exposed to the lowest overall temperatures.

The insulation layers can consist, for example, of mineral fiber sheets which can have the same basic shape as the ceiling elements 20. Aluminum oxide and-/or aluminum silicate fibers, for example, are suitable materials for such insulation (fiber) layers 27. Their temperature resistance lies between 1400° and 1600° C. Materials of lesser quality can be used for the outer insulation layers, such as stone fiber mats.

The insulation sheets 27 are preferably wider than the ceiling elements 20 so that they can cover several fire-resistant ceiling elements 20 at the same time, as shown in FIG. 2, and thus provide an additional seal.

The individual insulation layers should overlap each other. To improve the sealing effect in the area of the bearings 11a, 12a, these can be arranged in a graduated fashion so that the individual layers 27a, 27b, 27c increase in breadth towards the outside, when viewed from the furnace channel 14, in order to enable them to cover the next level completely.

The use of the above-described fiber mats makes it very easy to install the insulation on the fire-resistant ceiling elements 20. Since such insulation exerts very little pressure from above, the fire-resistant ceiling elements 20, made of the above-mentioned or similar materials, can self-supportedly cover a very great width span. This factor greatly increases the applicational range of the ceiling elements 20 according to the invention as well as of the ceilings 13, produced from these. In a tunnel roller furnace, as shown in FIG. 1, said fire-resistant ceiling elements are used with a length of approximately 2.65 m and a breadth of approximately 50 cm. Even greater lengths are possible and the self-supporting ceiling elements need not be supported or held by anything other than the bearings on each side. Metallic support, which is required for conventional hanging ceilings, is rendered totally unnecessary.

If industrial furnaces with a particularly wide furnace chamber, i.e., with a particularly wide distance between the side bearings for the ceiling, are required, the furnace ceiling 13 according to the invention can also consist of several furnace ceiling parts 13 a, b, as shown in the example in FIG. 6.

The individual furnace ceiling parts 13a, b structurally more or less correspond to the furnace ceiling as described above; i.e., they are made of subsequently arranged, self-supporting, fire-resistant ceiling elements 20 and insulation layers 27a, b, c arranged thereupon.

In order to make the furnace ceiling parts 13a, b, consisting of one or more parts, one next to the other, self-supporting, the individual furnace ceiling parts 13a, b must be connected to each other in such a fashion as to achieve this purpose.

The version in FIG. 6 suggests a connecting piece 28 which essentially has a double T-shape. The fire-resistant ceiling elements 20 tightly fit with their sides, pointing towards the middle of the furnace channel, into the side openings 28a, 28b of the connecting piece 28. The fitting of the fire-resistant ceiling elements 20 in the connecting piece 28, which preferably consists of the same material as the fire-resistant ceiling elements 20, is chosen so that the overall result is a self-supporting construction between the bearings 11b, 12b, on the side walls. It is advantageous to provide the horizontal sections 11b, 12b in the side walls. It is advantageous to provide the horizontal sections 11b, 12b in the area of the bearings 11a, 12a with a slightly rising shape towards the inside of the furnace so that the ceiling 13 all in all has a slightly arched shape. To this end the fire-resistant ceiling elements 20 must, on one hand, fit tightly into the connecting piece 28, i.e., its openings 28a, 28b, but on the other hand, must provide some space, especially horizontally, to absorb possible thermal expansion. The invention offers a solution which suggests that the fire-resistant ceiling elements have at their ends, i.e., towards the vertical sections of the bearings 11a, 12a, and/or towards the vertical sections of the openings 28a, 28b of the connecting piece 28, a spring-like support (not shown).

The final version can of course also be used with a furnace ceiling according to FIGS. 1 and 2.

Other versions and variations of this presentation are very possible.

The rest of the ceiling construction, i.e., especially the insulation, corresponds to that described above. Light fiber insulation qualities can also be used here, so that only little weight is exerted on the ceiling elements 20.

Because of the favorable thermal shock resistance, low creep expansion under high temperatures and thus high form stability of the ceiling elements 20, tensions and thus shifting of the building parts of the furnace ceiling against each other are reliably avoided, so that also abrasions of the fire-resistant ceiling elements 20 and consequently falling fire-resistant particles must no longer be feared.

The characteristics of the invention revealed in the description above, in the drawings as well as in the claims, can be important separately as well as in any combination for the realization of the invention in its different variations.

I claim:

1. A self-supporting ceiling element for an industrial furnace, wherein said ceiling element comprises a sheet of silicon carbide, having, related to the temperature achievable in the furnace chamber, a sufficient temperature resistance and flectional strength, without any reinforcing means, to be self-supporting in a ceiling in an industrial furnace, and connecting means for connecting said ceiling element to and adjacent similar ceiling element.

2. A ceiling element as defined in claim 1, made of recrystallized silicon carbide.

3. A ceiling element as defined in claim 1, wherein said ceiling element comprises reaction bonded silicon carbide (SiSiC).

4. A self-supporting ceiling element as defined in claim 1, wherein said ceiling element comprises a sheet of recrystallized silicon carbide or reaction bonded silicon carbide (SiSiC), and means for reinforcing said sheet.

5. A ceiling element as defined in claim 1, constructed with an (in plane view) essentially rectangular shape of great length.

6. A self-supporting ceiling element for an industrial furnace, wherein said ceiling element comprises a fire-resistant ceramic material, having, related to the temperature achievable in the furnace chamber, a sufficient temperature resistance and flectional strength, without any reinforcing means, and being adapted to connect to an adjacent ceiling element,
    wherein the ceiling element shows a cross-section, perpendicular to its longitudinal extension of an undulated, saw-tooth or merlon type.

7. A self-supporting ceiling element for an industrial furnace, wherein said ceiling element comprises a sheet of silicon carbide, having, related to the temperature achievable in the furnace chamber, a sufficient temperature resistance and flectional strength, without any reinforcing means, to be self-supporting in a ceiling in an industrial furnace, and connecting means for connecting said ceiling element to an adjacent similar ceiling element,
    wherein at least one of its two long-sides is shaped in order to obtain a form closure or frictional connection with another ceiling element adapted thereto.

8. A self-supporting ceiling element for an industrial furnace, wherein said ceiling element comprises a sheet of fire-resistant ceramic material, having, related to the temperature achievable in the furnace chamber, a sufficient temperature resistance and flectional strength, without any reinforcing means, to be self-supporting in a ceiling in an industrial furnace, and connecting means for connecting said ceiling element to an adjacent similar ceiling element,
    wherein the long-sides are turned up giving the ceiling element a U-shaped cross-section.

9. A ceiling for an industrial furnace comprising several fire-resistant ceiling elements arranged one next to the other, as defined in claim 1, and one or several insulating layers arranged thereupon, preferably of fibres, especially fibres of Alumina ($Al_2O_3$) or Aluminum Silicates.

10. A ceiling for an industrial furnace comprising several fire-resistant ceiling elements arranged one next to the other, wherein said ceiling element is self-supporting and comprises a fire-resistant ceramic material, having, related to the temperature achievable in the furnace chamber, a sufficient temperature resistance and flectional strength, without any reinforcing means, and being adapted to connect to an adjacent ceiling element, and one or several insulating layers arranged thereupon, preferably of fibers, especially fibers of Alumina ($Al_2O_3$) or Aluminum Silicates,
wherein said ceiling elements are connected to each other in a form fit or non-positive way by forming a closed ceiling sole.

11. An industrial furnace having two side walls and a furnace ceiling extending between said side walls, enclosing together with the bottom a furnace chamber and/or a furnace channel, wherein the ceiling of said furnace is constructed according to claim 9.

12. An industrial furnace according to claim 11, wherein the fire-resistant ceiling elements are directly or indirectly detachably secured with their opposing ends on the side walls.

13. An industrial furnace having two sidewalls and a furnace ceiling extending between said side walls, enclosing together with the bottom a furnace chamber and/or a furnace channel, wherein the ceiling of said furnace consists of several fire-resistant ceiling elements arranged one next to the other, said ceiling elements being self-supporting and consisting of a fire-resistant ceramic material, having, related to the temperature achievable in the furnace chamber, a sufficient temperature resistance and flectional strength, without any reinforcing means, and one or several insulating layers arranged thereupon, preferably of fibres, especially fibres of Alumina ($Al_2O_3$) or Aluminum Silicates, wherein the fire-resistant ceiling elements are supported at their sides by spring bearings in order to absorb thermal expansions.

14. A self-supporting ceiling element as defined in claim 1 for an industrial furnace wherein the ceiling element is constructed with an (in plan view) essentially rectangular shape of great length.

15. A ceiling element as defined in claim 14, made of recrystallized silicon carbide.

16. A ceiling element as defined in claim 14, wherein said ceiling element consists of reaction bonded silicon carbide (SiSiC).

17. A ceiling element as defined in claim 14 being reinforced by suitable means.

18. A self-supporting ceiling element for an industrial furnace, wherein the ceiling element is constructed with an essentially rectangular shape of great length and made of silicon carbide,
wherein the ceiling element shows a cross-section, perpendicular to its longitudinal extension of an undulated, saw-tooth or merlon type.

19. A self-supporting ceiling element for an industrial furnace, wherein the ceiling element is constructed with an (in plane view) essentially rectangular shape of great length and made of silicon carbide,
wherein at least one of its two long-sides is shaped in order to obtain a form closure or frictional connection with another ceiling element adapted thereto.

20. A self-supporting ceiling element for an industrial furnace, wherein the ceiling element is constructed with an (in plane view) essentially rectangular shape of great length and made of silicon carbide,
wherein the long-sides are turned up giving the ceiling element a U-shaped cross-section.

21. A ceiling for an industrial furnace comprising several fire-resistant ceiling elements arranged one next to the other, as defined in claim 14, and one or several insulating layers arranged thereupon, preferably of fibres, especially fibres of Alumina ($Al_2O_3$) or Aluminum Silicates.

22. A ceiling for an industrial furnace comprising several fire-resistant ceiling elements arranged one next to the other, wherein the ceiling element is self-supporting and constructed with an (in plane view) essentially rectangular shape of great length and made if silicon carbide, and one or several insulating layers arranged thereupon, preferably of fibers, especially fibers of Alumina ($Al_2O_3$) or Aluminum Silicates,
wherein said ceiling elements are connected to each other in a form-fit or non-positive way by forming a closed ceiling sole.

23. An industrial furnace having two side walls and a furnace ceiling extending between said side walls, enclosing together with the bottom a furnace chamber and/or a furnace channel, wherein the ceiling of said furnace is constructed according to claim 21.

24. An industrial furnace according to claim 23, wherein the fire-resistant ceiling elements are directly or indirectly detachably secured with their opposing ends on the side walls.

25. An industrial furnace having two side walls and a furnace ceiling extending between said side walls, enclosing together with the bottom a furnace chamber and/or a furnace channel, wherein the ceiling of said furnace comprises several fire-resistant ceiling elements arranged one next to the other, said ceiling elements being self-supporting and constructed with an (in plan view) essentially rectangular shape of great length and made of silicon carbide, and one or several insulating layers arranged thereupon, preferably of fibers, especially fibers of Alumina ($Al_2O_3$) or Aluminum Silicates,
wherein the fire-resistant ceiling elements are supported at their end sides by spring bearings in order to absorb thermal expansions.

26. A self-supporting ceiling element for an industrial furnace, wherein said ceiling element comprises a sheet of silicon carbide, having, related to the temperature achievable in the furnace chamber, a sufficient temperature resistance and flectional strength, without any reinforcing means, to be self-supporting in a ceiling in an industrial furnace, and having a plate-like configuration, and connecting means for connecting said ceiling element to an adjacent similar ceiling element.

27. A self-supporting ceiling element as defined in claim 1, further including means for reinforcing said sheet.

* * * * *